US010625620B1

(12) United States Patent
Plow

(10) Patent No.: US 10,625,620 B1
(45) Date of Patent: Apr. 21, 2020

(54) MULTI-FUNCTION DAMPER

(71) Applicant: Bendix Commercial Vehicle Systems LLC, Elyria, OH (US)

(72) Inventor: William Plow, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/217,461

(22) Filed: Dec. 12, 2018

(51) Int. Cl.
| | |
|---|---|
| *B60K 6/00* | (2006.01) |
| *B60L 15/32* | (2006.01) |
| *B60K 26/04* | (2006.01) |
| *B60K 6/26* | (2007.10) |
| *B60K 25/02* | (2006.01) |
| *B60L 1/00* | (2006.01) |

(52) U.S. Cl.
CPC ............... *B60L 15/32* (2013.01); *B60K 6/26* (2013.01); *B60K 25/02* (2013.01); *B60K 26/04* (2013.01); *B60L 1/00* (2013.01)

(58) Field of Classification Search
CPC . B60K 6/26; B60K 6/448; B60K 1/02; B60K 6/365; B60K 25/02; B60K 26/04
See application file for complete search history.

(56) References Cited

U.S. PATENT DOCUMENTS

| | | | |
|---|---|---|---|
| 6,247,437 B1 * | 6/2001 | Yamaguchi ............ | B60K 6/445 |
| | | | 123/179.3 |
| 6,269,895 B1 | 8/2001 | Tanuguchi et al. | |
| 6,563,230 B2 * | 5/2003 | Nada ...................... | B60L 58/21 |
| | | | 290/40 C |

(Continued)

FOREIGN PATENT DOCUMENTS

| | | |
|---|---|---|
| CN | 101318460 B | 4/2013 |
| JP | 3605674 B2 | 12/2004 |

(Continued)

OTHER PUBLICATIONS

Tutelea et al., "Design and control of a single stator dual PM rotors axial synchronous machine for hybrid electric vehicles", Proceedings of the 2011 14$^{th}$ European Conference on Power Electronics and Applications, Aug. 30-Sep. 1, 2011, IEEE, http://ieeexplore.ieee.org/document/6020137, ten pages.

(Continued)

*Primary Examiner* — Hau V Phan
(74) *Attorney, Agent, or Firm* — Crowell & Moring LLP

(57) ABSTRACT

A motor-generator system for hybrid electric internal combustion engine applications includes a selectively-engageable motor-generator located co-axially with a front end of the engine crankshaft. The motor-generator system includes at least a first rotor rotationally coupled with the crankshaft and an axially-displaceable stator which is held against rotation relative to the engine. Preferably, a motor-generator controller controls an actuator to axially displace the stator between engaged and disengages states. When in the engaged state, the stator electromagnetically interacts with the rotor to generate electric energy from crankshaft-supplied torque or to produce torque to deliver to the crankshaft and/or an engine accessory drive. The motor-generator system may have multiple axially-displaceable stators and rotors to increase the output of the motor-generator system.

20 Claims, 6 Drawing Sheets

(56) References Cited

U.S. PATENT DOCUMENTS

| | | | |
|---|---|---|---|
| 6,656,082 B1* | 12/2003 | Yamada | B60K 6/387 |
| | | | 477/5 |
| 6,710,492 B2 | 3/2004 | Minagawa | |
| 6,991,054 B2* | 1/2006 | Takaoka | B60K 6/365 |
| | | | 180/65.235 |
| 7,002,274 B2 | 2/2006 | Kim et al. | |
| 7,191,859 B2 | 3/2007 | Hashimoto | |
| 7,240,751 B2 | 7/2007 | Hoare et al. | |
| 7,614,466 B2 | 11/2009 | Kano et al. | |
| 8,231,504 B2 | 7/2012 | Hendrickson et al. | |
| 8,272,464 B2* | 9/2012 | Reinhart | B60K 1/02 |
| | | | 180/65.51 |
| 9,260,005 B2 | 2/2016 | Perry et al. | |
| 9,321,343 B2 | 4/2016 | Song et al. | |
| 9,702,443 B2 | 7/2017 | Erlston et al. | |
| 9,887,656 B2 | 2/2018 | Hijikata et al. | |
| 2002/0115516 A1* | 8/2002 | Kawabata | B60K 6/448 |
| | | | 475/5 |
| 2008/0236915 A1 | 10/2008 | Schulze et al. | |
| 2010/0252341 A1 | 10/2010 | Shu et al. | |

FOREIGN PATENT DOCUMENTS

| | | |
|---|---|---|
| JP | 2014-159186 A | 9/2014 |
| WO | WO 2008/081212 A1 | 7/2008 |

OTHER PUBLICATIONS

Viorel et al., "Integrated Starter-Generators for Automotive Applications", ACTA Electrotehnica, 2004, pp. 255-260, vol. 45, No. 3, Research Gate, https://www.researchgate.net/publication/228585887_Integrated_Starter-Generators_for_Automotive_Applications/download, seven pages.

\* cited by examiner

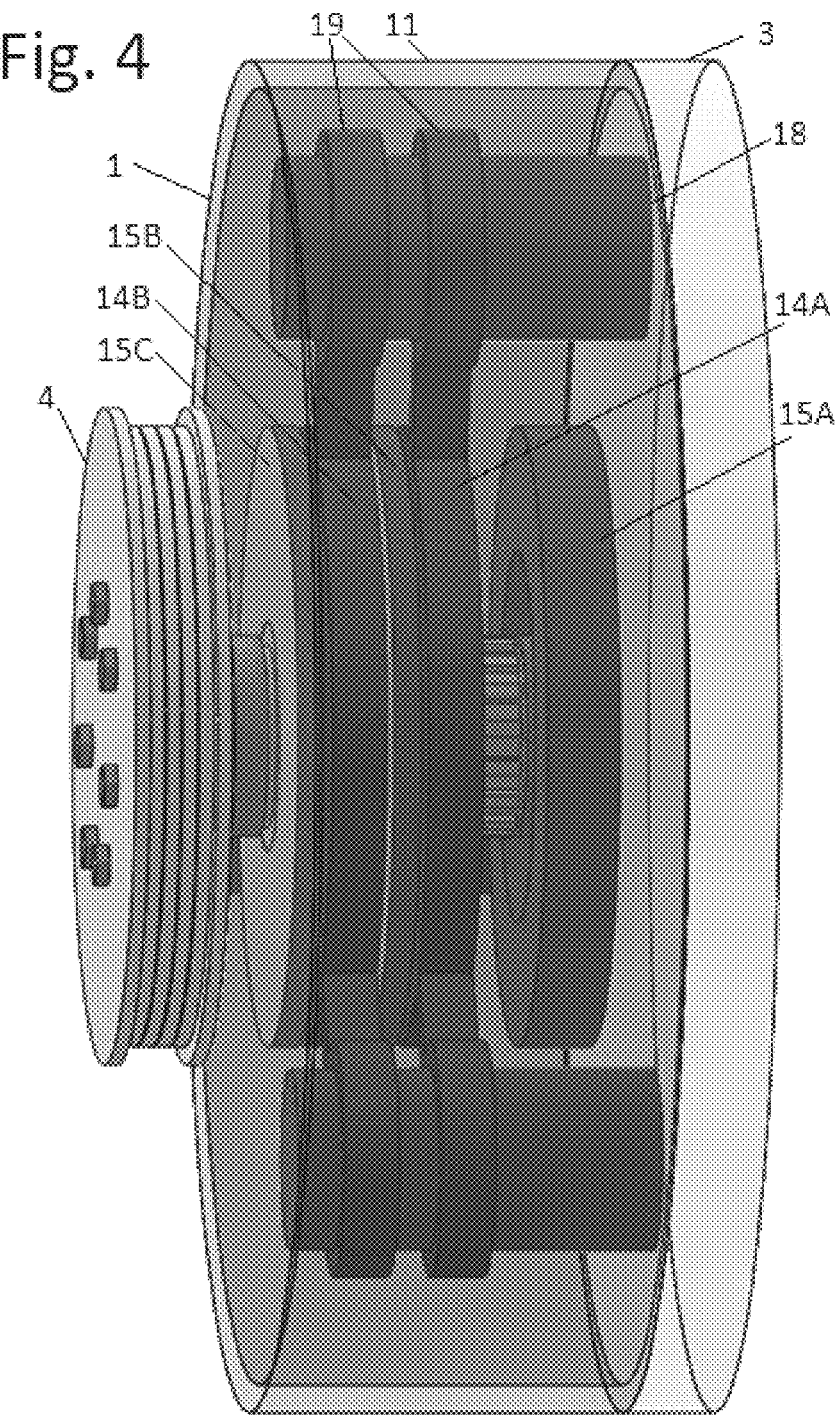

MULTI-FUNCTION DAMPER

BACKGROUND OF THE INVENTION

The present invention relates to hybrid electric vehicles, and in particular to a system for selective coupling of a hybrid electric generating and storage system with an internal combustion engine (ICE). The present invention further relates to a method of integrating an electric machine with the engine damper of an ICE for multiple purposes, such as vehicle deceleration, acceleration/torque assist, engine stop/start functionality, and energy storage.

BACKGROUND OF THE INVENTION

Hybrid electric vehicles having an internal combustion engine combined with a motor-generator and an electrical energy storage system have been the focus of considerable attention in the automotive field, particularly in the field of passenger vehicles. Development of hybrid electric vehicle systems has only recently begun to attract significant interest in commercial and off-road vehicles, e.g., trucks and busses in Vehicle Classes 2-8, in earth-moving equipment and railroad applications, and in stationary internal combustion engine-powered installations.

Hybrid electric technologies offer numerous advantages, including improvements in fuel efficiency, reduction in internal combustion engine emissions and vehicle noise to help meet government regulatory requirements, improved vehicle performance and lower fleet operating costs. These advantages are obtained in significant part by hybrid electric systems' ability to recapture energy which would otherwise be wasted (such as mechanical energy from braking that would otherwise be dissipated as thermal energy to the environment) and return of the captured energy at another time when needed, such as powering vehicle components in lieu of using the internal combustion engine as the source of power or assisting in vehicle propulsion.

Typically, hybrid electric vehicle motor-generators have been arranged either independently of the internal combustions engine (for example, using separate electric motors to power and recover energy from front wheels while the engine provides propulsion power to the rear wheels), or have been coupled to the engine, for example being integrated into the "rear" of the engine (i.e., the end at which the engine's flywheel is located) or between the engine and the driveline to the wheels. This "behind the engine" position permits the motor-generator equipment to deliver torque directly to the vehicle's driveline and wheels, and to be directly driven by the driveline, for example, during regenerative braking events. Examples of the latter include flywheel-type motor-generators in which a conventional engine's flywheel is modified to serve as a motor-generator rotor and a concentrically-mounted stator is located around the flywheel, and separate electric motors arranged between the engine and the drive wheels, such as the so-called "two mode hybrid" transmission offered by General Motors in the 2009 GMC Silverado light-duty pickup in which the transmission accommodated two electric motors for vehicle propulsion and electric energy generation.

Another form of adding a motor-generator to an internal combustion engine is the use of so-called starter-generators. This approach directly couples an electric motor to an engine to serve both as an electric generator (a function traditionally performed by a conventional belt-driven alternator) and as an engine starter, thereby reducing the weight and cost of duplicate alternator and starter electric motors. Such starter-generator installations are particularly useful in so-called engine stop-start systems which turn off the engine during periods when the vehicle is stopped to save fuel and reduce idling emissions. Starter-generators have been located behind the engine (for example, an appropriately engineered flywheel motor-generator may also be used as a starter), as well as being mounted at the front end of an engine where the starter-generator can drive a belt directly coupled to the engine crankshaft. An example of the latter system the "belt alternator starter" system that was offered by General Motors as an option in the 2007 Saturn Vue sport-utility vehicle. These systems are very difficult to adapt to large engines, such as commercial vehicle diesel engines, because the electric motor must be larger to deal with the much higher torque demands of these heavy-duty engines, such as starting and operating various components (for example, an engine cooling fan can demand upwards of 50 KW of power, a load that requires a large amount of torque to drive the fan belt). Further, the belt drive in such an enlarged system would need to have the capacity to transfer the large levels of torque, something that may not be possible, or at least practical, because thicker and broader drive belts and pulleys sufficient to handle the torque demands may be so much larger and heavier than their automotive counterparts that they are weight, size and/or cost prohibitive.

SUMMARY OF THE INVENTION

The present invention solves these and other problems by providing a hybrid electric vehicle system located at a front end of an engine, co-axially arranged at the front end of the engine crankshaft. The invention includes a relatively narrow-depth motor-generator unit that is selectively engageable with the crankshaft. Preferably, an engine accessory drive, such as a belt drive pulley, may be located co-axially with the crankshaft and the motor-generator unit, either in front of the motor-generator unit or between the motor-generator unit and the crankshaft.

As used in this description, the "front end" of the engine is the end opposite the end from which engine-generated torque output is transferred to the primary torque consumers, such as a vehicle's transmission and drive axles or a stationary engine installation's load, such as a pump drive. Typically, the rear end of an engine is where the engine's flywheel is located, and the front end is where components such as engine-driven accessories are located (e.g., air conditioning and compressed air compressors, engine cooling fans, coolant pumps, power steering pumps). While the discussions that follow focus primarily on commercial vehicle embodiments in which the engine crankshaft is aligned with the longitudinal axis of the vehicle, the present invention is not limited to front-engine, longitudinally-aligned engine applications, but also may be used with transverse-mounted engines (including transverse-mounted engines located at the front or rear of a vehicle) which may also have highly space-constrained environments in the region adjacent to the end of the engine opposite the flywheel end.

The motor-generator unit may include a housing or equivalent framework that locates the motor-generator unit in a rotationally-fixed manner relative to the engine. The stator portion of the motor-generating unit may in turn be rotationally fixed relative to the motor-generator housing or equivalent framework, with the non-rotational fixing including arrangements in which the stator remains axially displaceable.

The rotor portion is selectively driven by the crankshaft. For example, the rotor may be axially displaced into engagement with splines driven by the crankshaft by an electromagnetic "pull-in" clutch. Other approaches to rotationally coupling the rotor to the crankshaft are possible, such as an arrangement in which the rotor is axially fixed, and a separate clutch element, such as a dog clutch rotationally coupled to the crankshaft or an electromagnetically-actuated clutch, is axially displaced to engage the rotor with the crankshaft. The motor-generator may have a single stator and rotor pair, or may include multiple rotors and stators, as space in front of the engine permits. The multiple rotor and/or stator components may be arranged in an axial alternating manner. The rotor(s) and stator(s) are concentrically located along the rotation axis of the engine crankshaft.

Preferably, the length of the crankshaft or the length of a co-axial extension of the crankshaft has a fixed overall length, such that an engine accessory drive such as a belt drive pulley may be located in a fixed axial position in front of or behind the motor-generator.

Preferably, the first rotor in the motor-generator is coupled directly to the engine crankshaft. More preferably, the first rotor is configured in a manner that permits the first rotor to also serve as a crankshaft vibration damper, allowing the elimination of dedicated conventional damper commonly provided on engine crankshafts.

The rotor(s) and stator(s) by be different types of electric motors. The rotor in particular may, for example, include permanent magnets or be a solid salient-pole rotor (i.e., having projecting magnetic poles) made from a soft magnetic material such as laminated steel such as those used in Induction Machines (AC Motors) and Switched Reluctance Machines. The present invention is not limited to the foregoing types of electric motors, but include any rotor and stator configuration suitable for use in the environment of the front of an engine crankshaft.

In the case of a solid salient pole motor, axial displacement of the rotor would not be necessary because electromagnetic coupling of the rotor and the stator of such a motor may be controlled by controlling current that generates a magnetic field in the stator. Nonetheless, a solid salient pole motor also could be used with an axial displacement mechanism that disengages the rotor, for example, to eliminate rotational drag when there is no magnetic field generation in the stator.

While the present disclosure is primarily directed to use of the inventor motor-generator system in vehicle applications (in particular, to commercial vehicle applications), the system is also well-suited for use with stationary engine installations such as standby diesel generators, off-road engine applications such as self-propelled construction equipment, and other engine applications in which the available space for providing hybrid electric capability at the front of the engine is limited.

In operation, a motor-generator controller may selectively control the engagement of the motor-generator with the engine crankshaft to generate electrical energy or conversely to convert stored electrical energy into torque to supply supplemental torque to the engine crankshaft to increase the total output of propulsion torque and/or engine accessory drive torque.

More specifically, when operating conditions allow, the motor-generator may be engaged such that mechanical energy can be recovered by the motor-generator from the engine crankshaft (i.e., recovering mechanical energy from the wheels that is transferred to the motor-generator through the drive line to the engine crankshaft). For example, the motor-generator may be engaged during deceleration events to allow the motor-generator to serve as a generator in a regenerative braking mode, a mode that also generates cost savings in reduced brake pad or brake shoe wear and fuel consumption savings by minimizing brake air use and the associated compressed air consumption. The motor-generator also may be engaged when there is any other "negative torque" demand, such as when there is a need to provide a retarding force to minimize undesired vehicle acceleration due to gravity when the vehicle is travelling down a hill. In this operating mode the motor-generator acts as a "silent retarder," avoiding the use of a loud engine retarder that creates objectionable noise pollution.

Similarly, when operating conditions allow the motor-generator may be operated as a torque-producing motor to supply supplemental torque to the engine crankshaft, thereby increasing the total torque output supplied to the vehicle driveline to improve vehicle acceleration.

Another use of the inventive motor-generator system is as the primary engine starter, eliminating the need for a heavy, dedicated starter motor. In this mode of operation the motor-generator is engaged to permit motor-generator torque to be transferred directly to the engine crankshaft. This use of the motor-generator is well suited to the motor-generator's operating characteristics, as the motor-generator 1 is capable of producing very high torque output starting at zero rpm, and do so nearly instantaneously. The very quick reaction time of the motor-generator and ability to do so multiple times without overheating also makes the motor-generator 1 suitable for use as the primary engine starting motor in a fuel-conserving engine "stop/start" system in which the engine is started and stopped multiple times a day. The short re-start reaction time capability is highly desired in stop/start system applications, where it avoids an undesirable substantial delay in automatic engine re-starting in response to the driver's demand to begin moving again (typically, a demand generated by releasing the vehicle's brake pedal following a traffic signal turning green).

Alternatively, the motor-generator may be operated as an engine starter in cooperation with a pneumatic starter motor that converts stored compressed air pressure to a mechanical torque output (a pneumatic starter typically being lighter and lower cost than a conventional electric starter motor). The engine system weight and cost may be improved with a combined motor-generator/pneumatic starting arrangement, as the supplemental torque output of the pneumatic starter may permit the motor-generator size to be reduced in the case where the highest anticipated torque demand on the motor-generator is associated with engine starting (in particular, cold engine starting). In such a case, the motor-generator may be sized to meet the torque demand of the next-lower demand (for example, the highest expected torque demand from the most demanding combination of engine accessories), with the pneumatic starter being available to provide the additional engine starting torque needed above that provided by the smaller motor-generator.

The motor-generator also may be driven in a manner that eliminates the need to equip the engine with a heavy, dedicated alternator to supply operating voltage for a typical vehicle's 12 volt direct current electrical circuits, such as vehicle lighting circuits, power supplies to electronics modules and 12 V-powered driver-comfort features (heated seats, sleeper compartment electrics, etc.).

In addition to the already mentioned features, capabilities and advantages, the present invention's front end motor-generator approach has the important advantage of not requiring substantial modifications to the front of a vehicle, such as lengthening of the nose of a commercial vehicle tractor or increasing the size of an engine compartment of a diesel-powered municipal bus. This is the result of the inventive motor-generator system being sufficiently axially compact that it is readily accommodated between the front of the engine and the engine's coolant radiator. As a result, this motor-generator system is well suited for incorporation into existing vehicle designs, both during the course of new vehicle assembly and by retro-fitting existing internal combustion engines to upgrade older vehicles (particularly commercial vehicles) and stationary engine installations with hybrid-electric technology.

The application of the inventive motor-generator system is not limited to applications in which the motor-generator is the sole electric generator. Synergies may be realized by the addition of the motor-generator system front end installation to an engine and/or drivetrain that also includes another motor-generator unit to the rear of the crankshaft, for example, a flywheel motor-generator or a motor-generator farther downstream in the driveline, such as a motor-generator incorporated into a transmission. The combination of the inventive motor-generator system and a "back end" hybrid electric arrangement presents opportunities for overall vehicle operational improvements. For example, the presence of both front and back-end systems may enable one or both of the motor-generators to be reduced in size and weight while still meeting vehicle demands, because neither motor-generator needs to be sized to handle all of the vehicle's electrical demands where there is no longer a need for all of the vehicle's electric generation and power supply demands to be met by only one motor-generator. Further, operational flexibility may be increased by the presence of two motor-generators if each is able to meet at least essential vehicle demands in the event of failure of the other motor-generator, thereby permitting the vehicle to continue in operation, perhaps at reduced performance, until reaching a time or place where repairs may be performed.

The present invention is also not limited to configuration in which all of the axially-displaceable rotor and stator components must move axially together. For example, the invention includes embodiments in which individual pairs of rotors and stators may be selectively engaged or disengaged, thereby providing the capability of "fine tuning" the amount of electric energy or torque generation by the motor-generator system to the current operational need (for example, reducing the number of rotor-stator pairs engaged to minimize the load on the engine when larger amounts of electric energy are not needed, thereby improving system efficiency.

Other objects, advantages and novel features of the present invention will become apparent from the following detailed description of the invention when considered in conjunction with the accompanying drawings.

BRIEF DESCRIPTION OF THE DRAWINGS

FIG. 4 is an oblique transparent illustration of the motor-generator system of FIG. 3.

DETAILED DESCRIPTION OF THE DRAWINGS

Figure 1:
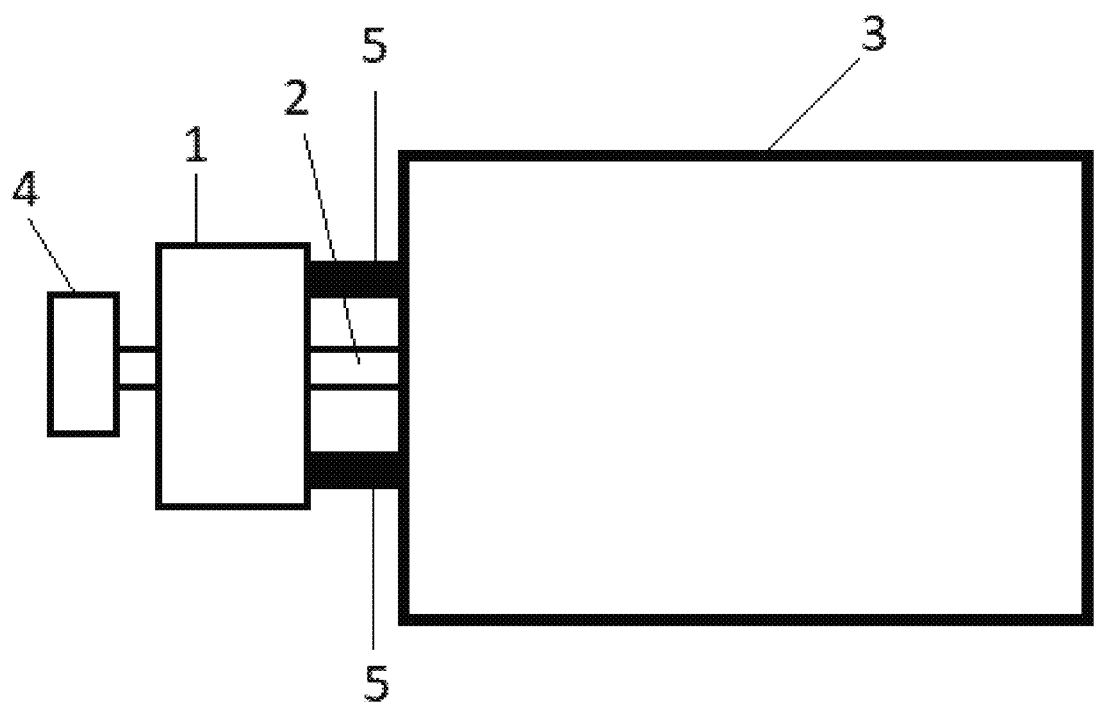
FIG. 1 is a schematic illustration of an overall view of the arrangements of a motor-generator system in accordance with an embodiment of the present invention at the front end of an engine.

FIG. 1 is a schematic illustration of an embodiment of the present invention with a motor-generator unit 1 coupled to the front end of a crankshaft 2 of an engine 3, with an optional engine accessory drive 4 in front of the motor-generator unit 1. In this embodiment the motor-generator 1 is mounted in a rotationally-fixed manner to the engine 3 by support members 5.

Figure 2:
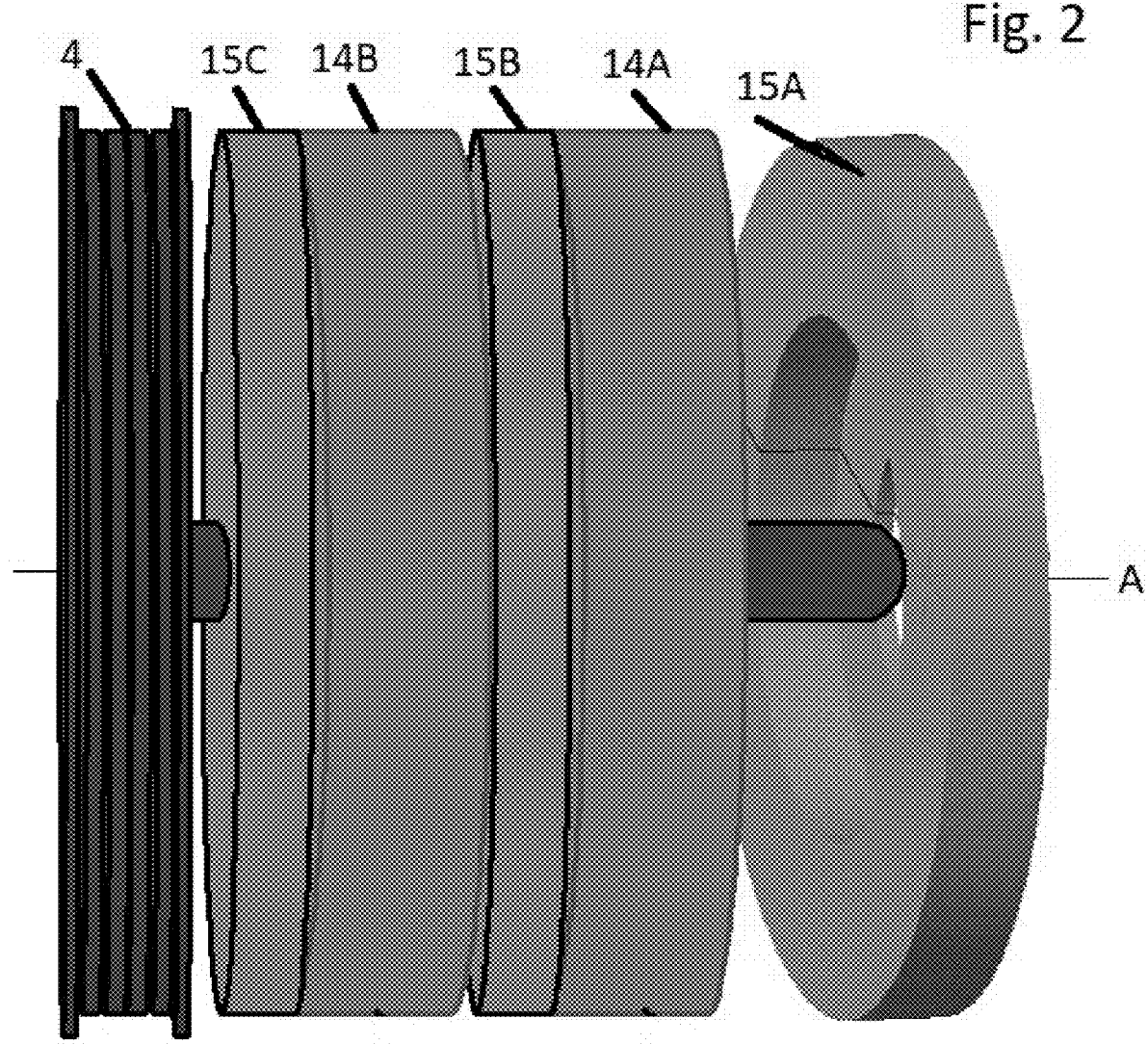
FIG. 2 is a schematic illustration of the primary components of a motor-generator system in accordance with an embodiment of the present invention.
Figure 3:
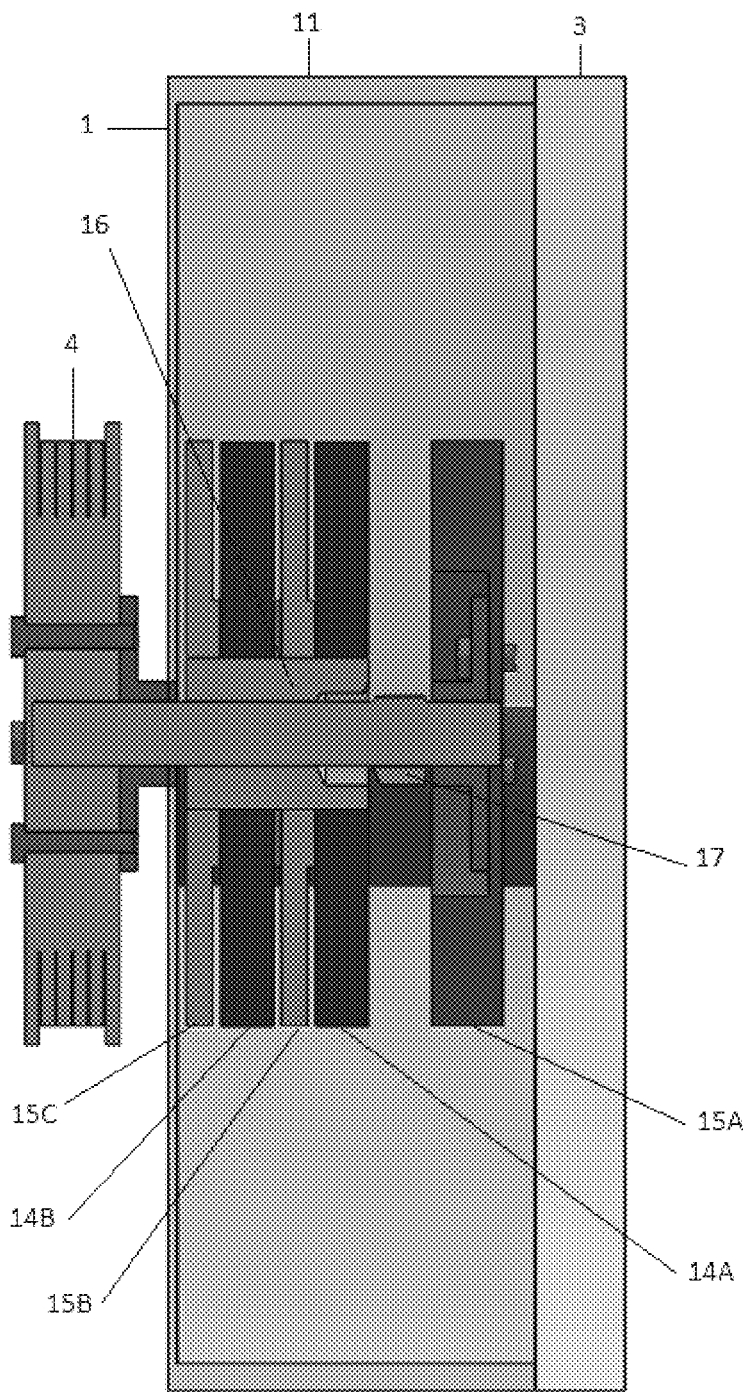
FIG. 3 is a schematic cross-section illustration of a motor-generator system containing the FIG. 2 primary components of the present invention.

FIG. 2 is schematic exploded view of the arrangement of the primary elements of the motor-generator 1, without its housing. The motor-generator unit housing 11 and motor-generator are shown in the FIG. 3 cross-section view. The housing 11 may have a separate housing back plate, ot as shown in this embodiment, may be mounted directly on the engine 3. From right to left in FIG. 2 are depicted: (i) a first rotor 15A, which may also be configured to act as a crankshaft vibration damper in place of a conventional crankshaft-mounted damper unit, (ii) a first stator 14A; (iii) a second stator 15B; (iv) a second stator 14B; (v) a third rotor 15C; and (vi) the engine accessory drive 4 in the form of a belt drive pulley. In this embodiment, the second and third rotors 15B, 15C are rotationally fixed on an axially displaceable hub 16, visible in FIG. 3, while the first and second stators 14A, 14B are held rotationally fixed relative to the housing 11, i.e., located concentrically on the hub 16, but not rotationally fixed to the hub.

When the engine is operating, the rotor/damper 15A is rotating with the crankshaft. When activated, the hub 16 is displaced axially toward the engine 3 until a coupling 17 (such as a corresponding male/female splines shown in FIG. 3) couples the hub 16 to rotate with the crankshaft 2. The axial displacement of the hub 16 has two primary effects, moving the first stator 14A closer to the first rotor 15A to increase electromagnetic interaction between these components, and rotating the second and third rotors 15B, 15C relative to the stationary stators 14B, 14C to cause electromagnetic interaction between these further motor-generator components. The electromagnetic action may either generate electrical energy from the rotational kinetic energy of the crankshaft or generate torque that may be output to the crankshaft 2 and/or the engine accessory drive 4. Further, if an additional coupling is provided between the engine accessory drive 4 and the hub 16, the engine accessory drive 4 may be driven by the hub-mounted rotors 15B, 15C and stators 14A, 14B by electrical energy supplied to the motor-generator 1 from an electrical energy store such as a battery and/or supercapacitors.

The present invention is not limited to the above number of rotors and/or stators, but includes embodiments with a single rotor and a single stator, which would allow a particularly narrow housing to fit into space-constrained engine compartments, as well as more rotors and stators if additional electrical energy generation and/or torque output is desired in a particular application.

The invention also is not limited to the mounting of the hub directly on the crankshaft. For example, the hub may be located on a co-axial extension of the crankshaft. Further, if the crankshaft extension is selectively disengageable from the crankshaft and the hub is rotational fixed or fixable to the crankshaft extension, the motor-generator system 1 may be used to separately drive the engine accessory drive 4 using the stators and additional rotors located at the hub (i.e., without axial displacement of the hub to engage the crankshaft and the crankshaft-mounted first rotor). As a further alternative, in this selectively-engageable engine accessory drive arrangement the hub may be integrally formed with the crankshaft extension or altogether eliminated, with the additional rotors being rotationally coupled to the crankshaft extension.

FIG. 4 is a schematic phantom illustration of an embodiment of the motor-generator 1 viewing from an angle, presented to better illustrated an embodiment of a structure that holds the stators 14A, 14B against rotation, while permitting the stators to be axially displaced as the hub 16 is moved to engage the coupling 17. In this embodiment three posts 18 (two posts visible in FIG. 4, one out of view behind the rotors/stators) are fixed to the housing back plate 13. The stators 14A, 14B are held against rotation by brackets 19 having eyes that are axially displaceable along the posts 18. When the hub 16 is displaced toward the rotor 15A, the stators 14A, 14B with their respective brackets 19 can move axially relative to the fixed posts 18 while continuing to be fixed against rotation.

Figure 5A:
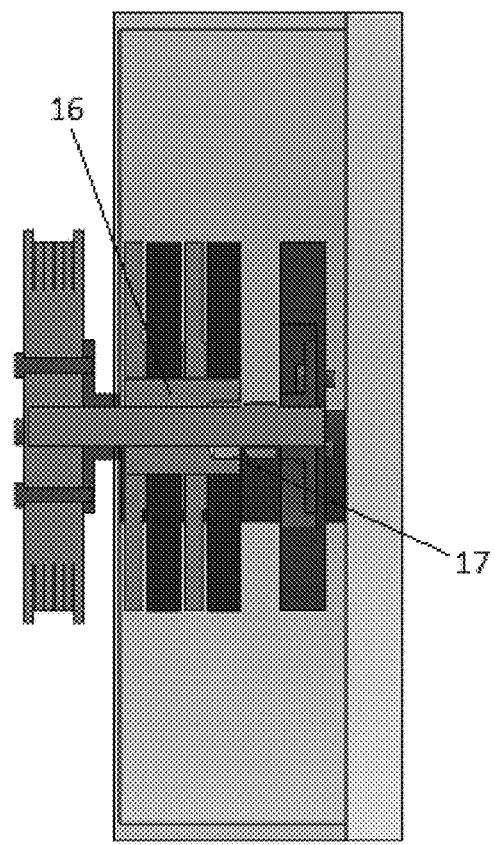
FIGS. 5A and 5B are illustrations of disengaged and engaged states, respectively, of the motor-generator system of FIG. 2.
Figure 5B:
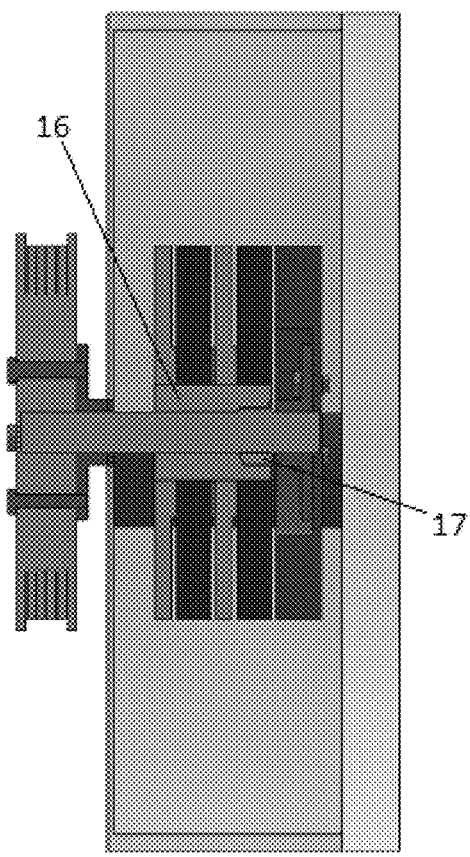

The disengaged and engaged states of the motor-generator 1 are schematically illustrated in FIGS. 5A and 5B, respectively, with FIG. 5B showing the hub 16 advanced into engagement with the splines of coupling 17.

Figure 6:
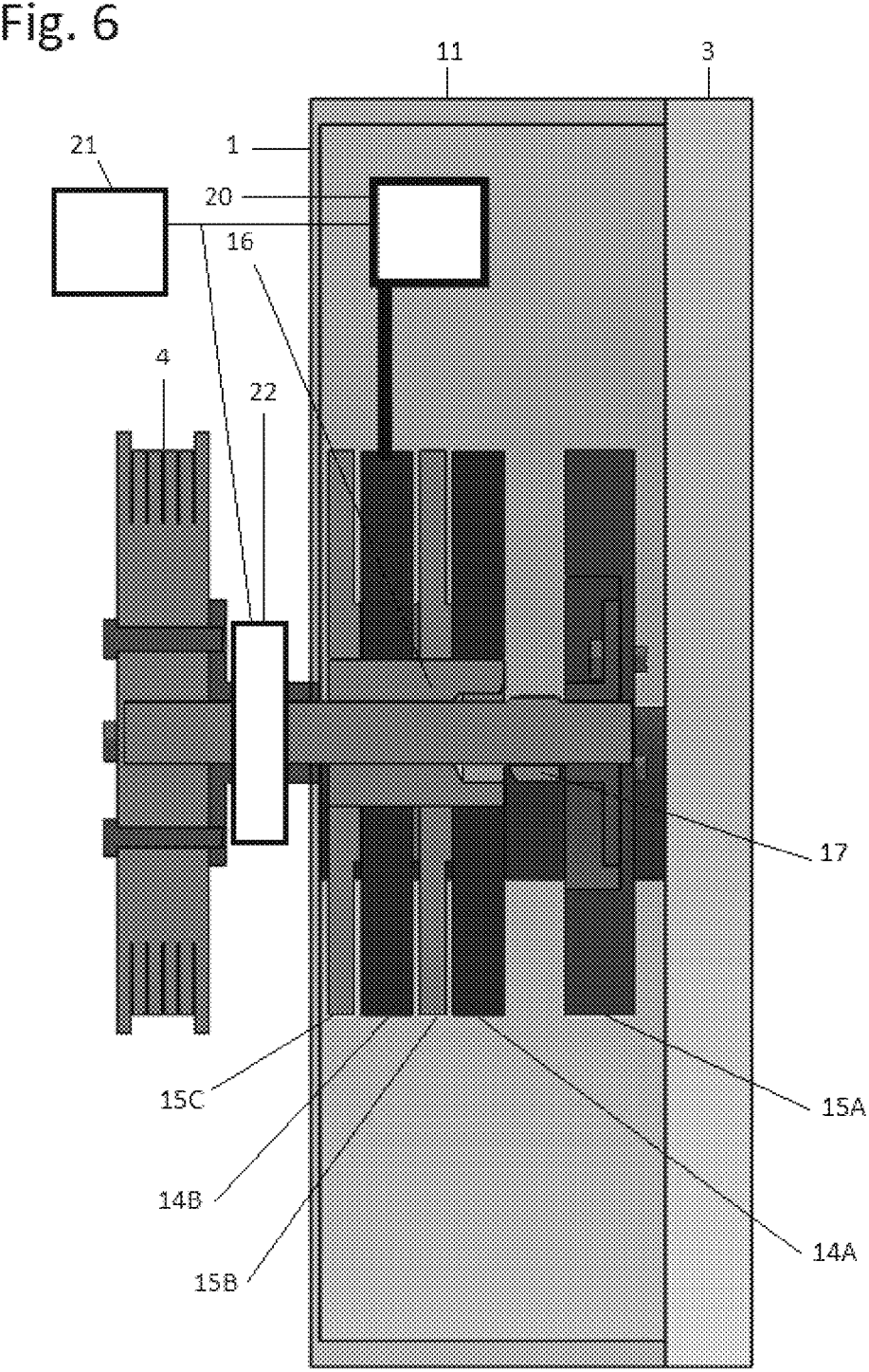
FIG. 6 is a schematic illustration of selective engagement actuators suitable for use in the motor-generator system of the present invention.

The selective engagement of the hub 16 with the crankshaft 2 may be performed in a variety of ways. For example, as schematically illustrated in FIG. 6, an electromagnetic clutch 20 (a so-called "pull-in clutch") may be electrically activated to displace the hub 16, in response to commands from a motor-generator controller 21 (in this embodiment, an electronic controller ("ECU"), shown in FIG. 6). Alternative motor-generator actuating arrangements, such as a mechanical lever coupled to a solenoid drive, may be used, as long as the ability to selectively advance and retract the stator(s)/rotors(s) to/from the crankshaft-mounted rotor 15A is provided.

FIG. 6 also schematically illustrates a selectively-operable accessory drive coupling 22 configured to couple the engine to the crankshaft or crankshaft extension. The accessory drive coupling 22 permits the engine accessory drive 4 to be selectively disengaged from the crankshaft or crankshaft extension to reduce the torque demand on the engine to save fuel or to make additional engine output torque available to downstream consumers during peak load events. Further, if the engine accessory drive 4 is coupled to a crankshaft extension that is selectively coupleable to the engine 3, the stators 14A, 14B and second and third rotors 15B, 15C may be used to drive the engine accessory drive 4 independently from the crankshaft, for example, when the engine is shut down during on-the-road engine stop-start operations or during overnight rest periods when the engine is shutdown but vehicle support services such as air conditioning or heating are still desired.

The motor-generator controller 21 controls the engagement of the motor-generator 1, according to the current operating mode demand, including a torque output mode in which the motor-generator 1outputs torque to be transferred to the engine accessory drive 4 and/or the engine crankshaft 1, a generating mode in which the motor-generator 1 generates electrical energy for storage and/or consumption, an idle mode in which the motor-generator 1 generates neither torque or electrical energy, engine starter mode in which the motor-generator 1 generates torque to start the engine 3 (either initial engine starting or as part of an engine "start-stop" system), and an alternator-replacement mode in which the motor-generator 1 provides electrical energy in lieu of a conventional engine-driven alternator.

The motor-generator controller 21 controls the motor-generator 1 based on a variety of sensor inputs and predetermined operating criteria, such as the state of charge of an energy store, the temperature level of the high voltage battery pack within the energy store, and the present or anticipated torque demand on the motor-generator 1. The controller 21 may be a stand-alone controller, preferably connected to other control modules and/or sensors, for example, via a CAN bus, or integrated with another control module. The communications may be via digital and/or analog signals with other vehicle electronic modules, both to obtain data used in the controller 21's motor-generator control algorithms, and to cooperate with other vehicle controllers to determine the optimum combination of overall system operations. For example, in one embodiment the controller 21 may be configured to receive from a brake controller a signal to operate the motor-generator 1 in generating mode to provide regenerative braking in response to a relatively low braking demand from the driver, in lieu of applying the vehicle's mechanical brakes or operating an engine brake (such as an exhaust path blocking valve or an engine valve lift modifying system (a so-called "jake brake"). The controller 21 is programmed to, upon receipt of such a signal, evaluate the current vehicle operating state and provide the brake controller with a signal indicating that regenerative braking is being initiated, or alternatively that electrical energy generation is not desirable and the brake controller should command actuation of the vehicle's mechanical brakes or retarder.

The motor-generator housing 11 may be open to the atmosphere to promote cooling of the components therein, or may be closed to prevent ingress of engine compartment contaminants into the housing. If a closed housing, preferably alternative cooling is provided, for example, by addition of cooling fins to the outer surface of the housing and/or addition of liquid cooling to the housing. Such liquid cooling for example may be integrated into or located on the housing walls. The liquid cooling may use a dedicated cooling fluid or a fluid already present on the vehicle, such as engine coolant or engine oil. The invention is not limited to cooling at the housing walls, and may include any approach to cooling that permits the motor-generator to function without exceeding operational limits.

The motor-generator housing 11 may also include an inverter (rectifier) module capable of converting rotational kinetic energy of the motor-generator to electrical energy for storage in an electrical storage mechanism. The inverter module is also capable of using store electrical energy to provide the necessary field(s) to rotate the motor-generator. This inverter/rectifier may also be mounted to vehicle separately from the motor/generator housing.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 motor-generator
2 crankshaft 3 engine
4 accessory drive
5 motor-generator support
11 housing
14A, 14B stator
15A-15C rotor
16 hub
17 coupling
18 post
19 bracket
20 electromagnetic clutch
21 controller
22 selectively-operable accessory drive coupling

What is claimed is:

1. A hybrid electric front end motor-generator system, comprising:
    a first rotor of an electric motor co-axially aligned with a rotation axis of a crankshaft of an internal combustion engine and rotationally coupled to one or both of the front end of the crankshaft and a crankshaft vibration damper connected to the front end of the crankshaft;
    a first stator of the electric motor arranged co-axially with the first rotor;
    a motor-generator controller configured to control electromagnetic coupling of the first stator with the first rotor, and
    a selectively operable actuator configured to axially displace the first stator toward the first rotor such that the rotor and stator are positioned to electromagnetically interact to one or both of generate electrical energy from torque supplied from the crankshaft and generate torque from electrical energy supplied to the motor-generator system,
    the controller is configured to control electromagnetic coupling of the first stator with the first rotor by controlling operation of the selectively operable actuator to axially displace the first stator toward the first rotor.

2. The hybrid electric front end motor-generator system of claim 1, wherein
    the electric motor is a solid salient pole motor, and
    the controller is configured to control electromagnetic coupling of the first stator with the first rotor by controlling flow of magnetic field-generating current to the first stator.

3. The hybrid electric front end motor-generator system of claim 2, wherein
    the motor-generator controller is configured to control the flow of the magnetic field-generating current to the first stator based on engine operating conditions.

4. The hybrid electric front end motor-generator system of claim 2, wherein
    the motor-generator controller is configured to
        receive operating state information from one or more of at least one other controller or at least one sensor,
        select based on the operating state information which of a plurality of motor-generator operating modes the motor-generator system is to be operated, and
        control the flow of the magnetic field-generating current to the first stator in accordance with the selected motor-generator operating mode, and
    the plurality of motor-generator operating modes includes
        an electrical energy generation mode in which the motor-generator receives torque from the crankshaft to generate electrical energy,
        a torque generation mode in which the motor-generator delivers torque to the crankshaft,
        an engine start mode in which the engine is stopped and the motor-generator delivers torque to the initiate rotation of the crankshaft, and
        an engine accessory drive mode in which the motor-generator generates torque for delivery to the engine accessory drive.

5. The hybrid electric front end motor-generator system of claim 4, further comprising:
    a selectively operable accessory drive coupling controllable by the controller to control driving of the selectively operable accessory drive by one or both of the motor-generator system and the crankshaft.

6. The hybrid electric front end motor-generator system of claim 5, wherein
    the selectively operable accessory drive coupling is an electromagnetic clutch.

7. The hybrid electric front end motor-generator system of claim 1, wherein
    the first rotor is integrated with a crankshaft damper.

8. The hybrid electric front end motor-generator system of claim 1, further comprising:
    an engine accessory drive aligned co-axially with the crankshaft rotation axis and arranged to be driven by one or both of the motor-generator system and the crankshaft.

9. The hybrid electric front end motor-generator system of claim 8, wherein
    the motor-generator controller is configured to
        receive operating state information from one or more of at least one other controller or at least one sensor,
        select based on the operating state information which of a plurality of motor-generator operating modes the motor-generator system is to be operated, and
        control operation of the selectively operable actuator to an engaged state or a disengaged state in accordance with the selected motor-generator operating mode, and
    the plurality of motor-generator operating modes includes
        an electrical energy generation mode in which the selectively operable actuator is engaged and the motor-generator receives torque from the crankshaft to generate electrical energy,
        a torque generation mode in which the selectively operable actuator is engaged and the motor-generator delivers torque to the crankshaft,
        an engine start mode in which the engine is stopped and the selectively operable actuator is engaged and the motor-generator delivers torque to the initiate rotation of the crankshaft, and
        an engine accessory drive mode in which the motor-generator generates torque for delivery to the engine accessory drive.

10. The hybrid electric front end motor-generator system of claim 9, further comprising:
    a selectively operable accessory drive coupling controllable by the controller to control driving of the selectively operable accessory drive by one or both of the motor-generator system.

11. The hybrid electric front end motor-generator system of claim 10, wherein
    the selectively operable accessory drive coupling is an electromagnetic clutch.

12. The hybrid electric front end motor-generator system of claim 1, further comprising:
    an axially displaceable hub co-axially aligned with the crankshaft rotation axis;
    at least one additional rotor; and
    at least one additional stator, wherein
- the first stator, the at least one additional stator and the at least one additional rotor are co-axially located with the hub with the first stator closest to the first rotor,
- the hub includes a coupling portion configured to engage a corresponding coupling portion driven by the crankshaft such that when the hub is axially displaced the coupling portions engage and the hub rotates with the crankshaft, and
- the at least one additional rotor is rotationally coupled to the hub such that the at least one additional rotor rotates with the hub when the coupling portions are engaged.

13. The hybrid electric front end motor-generator system of claim 12, further comprising:
- the motor-generator controller is configured to control the selectively operable actuator to control the axial displacement of the hub between coupling disengaged and engaged states.

14. The hybrid electric front end motor-generator system of claim 13, wherein
- the motor-generator controller is configured to control the selectively operable actuator based on engine operating conditions.

15. The hybrid electric front end motor-generator system of claim 13, wherein
- the motor-generator controller is configured to control the motor-generator system when in the engaged state to generate electrical energy or generate torque.

16. The hybrid electric front end motor-generator system of claim 13, wherein
- the hub is located on a crankshaft extension aligned co-axially with the front end of the crankshaft.

17. The hybrid electric front end motor-generator system of claim 16, wherein
- the crankshaft extension is selectively coupleable to the crankshaft.

18. The hybrid electric front end motor-generator system of claim 16, wherein
- the hub is integrally formed with the crankshaft extension.

19. The hybrid electric front end motor-generator system of claim 1, wherein
- the motor-generator controller is configured to control the selectively operable actuator based on engine operating conditions.

20. A hybrid electric front end motor-generator system, comprising:
- an internal combustion engine including an engine crankshaft having a front end opposite a rear end at which an engine flywheel is located, the engine being configured to transfer torque from the rear end of the crankshaft to a torque consumer;
- a motor-generator system, the motor-generator system including
  - a first rotor of an electric motor co-axially aligned with a rotation axis of the crankshaft and rotationally coupled to the front end of the crankshaft,
  - a first stator of the electric motor arranged relative to the engine in an axially-displaceable, rotationally fixed manner, and being co-axially aligned with the crankshaft rotation axis,
- a selectively operable actuator configured to axially displace the first stator toward the first rotor such that the rotor and stator are positioned to electromagnetically interact to one or both of generate electrical energy from torque supplied from the crankshaft and generate torque from electrical energy supplied to the motor-generator system.

* * * * *